United States Patent
Lee et al.

(10) Patent No.: US 8,159,154 B2
(45) Date of Patent: Apr. 17, 2012

(54) APPARATUS AND METHOD OF DRIVING BACKLIGHT UNIT AND DISPLAY APPARATUS EMPLOYING THE SAME

(75) Inventors: Kon-Ho Lee, Seongnam-si (KR); Kil-Soo Choi, Suwon-si (KR); Bum-Joon Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 773 days.

(21) Appl. No.: 12/263,777

(22) Filed: Nov. 3, 2008

(65) Prior Publication Data

US 2009/0243496 A1   Oct. 1, 2009

(30) Foreign Application Priority Data

Mar. 31, 2008 (KR) .................. 10-2008-0029887

(51) Int. Cl.
*H05B 37/02* (2006.01)
*H05B 39/04* (2006.01)
*H05B 41/36* (2006.01)

(52) U.S. Cl. ........ 315/360; 315/308; 315/175; 345/207; 345/102

(58) Field of Classification Search ............... 315/169.2, 315/169.3, 175, 308, 323, 360; 345/207, 345/690, 214, 211, 76, 77, 87, 95, 102
See application file for complete search history.

(56) References Cited

U.S. PATENT DOCUMENTS

2005/0231457 A1* 10/2005 Yamamoto et al. ........... 345/102
2009/0261753 A1* 10/2009 Kishioka et al. .............. 315/294

* cited by examiner

*Primary Examiner* — Shawki S Ismail
*Assistant Examiner* — Jany Tran
(74) *Attorney, Agent, or Firm* — F. Chau & Associates, LLC

(57) ABSTRACT

An apparatus and a method of driving a backlight unit and a display apparatus employing the same. Wherein a driving current, which is divided in a step-by-step fashion, is sequentially changed and output according to a current control signal. The current control signal is divided into low levels and high levels that are consecutively and repeatedly applied to a backlight controller. The driving current is reduced from a reference current corresponding to a number of the high levels during a time period that starts when the low level is applied for at least a first reference time interval and ends when the high level is applied for at least a second reference time interval.

20 Claims, 4 Drawing Sheets

APPARATUS AND METHOD OF DRIVING BACKLIGHT UNIT AND DISPLAY APPARATUS EMPLOYING THE SAME

CROSS-REFERENCE TO RELATED APPLICATION

This application relies for priority upon Korean Patent Application No. 2008-29887 filed on Mar. 31, 2008, the contents of which are herein incorporated by reference in their entirety.

BACKGROUND

1. Technical Field

The present disclosure relates to an apparatus and a method of driving a backlight unit and a display apparatus employing the same.

2. Discussion of Related Art

A display apparatus to display information has occupied an important position in modern society. Accordingly, recently, various display apparatuses have been developed and extensively used in various fields.

Among such display apparatuses, a flat panel display has been mainly used for electronic appliances. As a representative flat panel display, a liquid crystal display (LCD) displays images using electrical and optical characteristics of liquid crystal. Because the LCD has a slim and light structure and operates at low power consumption and a low driving voltage as compared with other display apparatuses, the LCD has been widely used overall in many industrial fields.

The LCD includes a liquid crystal panel to display an image, a backlight unit to supply light to the liquid crystal display panel, and a driver to drive the liquid crystal display panel and the backlight unit.

In a conventional LCD, an adaptive brightness control (ABC) scheme has been employed in a dimming process in order to reduce power consumption of the backlight unit. According to the ABC scheme, a current of the backlight unit is automatically adjusted according to the brightness of external light and the brightness of a displayed image. When the ABC scheme is performed through pulse code modulation (PCM), even though the PCM has advantages in terms of less noise of a driving current and operational stability of the LCD, a person recognizes the brightness variation of a screen when the LCD is abruptly driven in a dark environment, so that the person does not sufficiently conceive the image being displayed.

SUMMARY

Therefore, an exemplary embodiment of the present invention provides an apparatus driving a backlight unit capable of adaptively controlling brightness according to an external condition without any deterioration of image quality.

An exemplary embodiment of the present invention provides a method of driving the backlight unit.

An exemplary embodiment of the present invention provides a display apparatus employing the driving apparatus and method.

In an exemplary embodiment of the present invention, a method of driving a backlight unit is performed as follows. A driving current, which is divided step by step, is selectively changed and output according to a current control signal. The current control signal is divided into low levels and high levels that are consecutively and repeatedly applied. The driving current is reduced from a reference current corresponding to a number of the high levels during a time period that starts when the low level is applied for at least a first reference time interval and ends when the high level is applied for at least a second reference time interval.

The low level is applied for less than a third reference time interval. The driving current may not be output when the low level is applied for at least the third reference time interval.

The driving current may be reduced by one step whenever the high level is applied after the low level is applied for less than the first reference time interval.

In an exemplary embodiment of the present invention, a method of driving a backlight unit is performed as follows.

A first driving current reduced by a predetermined level is output when a first clock is applied. A second driving current reduced by n times the predetermined level, is output when a second clock having a period different from a period of the first clock is applied, in which the n is a natural number greater than or equal to 2.

The second clock may be applied when a low level of the first clock is applied for at least a first reference time interval and for less than a second reference time interval.

The second driving current may be output when a high level of the second clock is applied for at least a third reference time interval.

The n is a number of high levels of the second clock when the high levels of the second clock are applied for less than the third reference time interval.

The second driving current is reduced step by step and then reduced to a predetermined level.

In an exemplary embodiment of the present invention, an apparatus of driving a backlight unit includes a modulator and a backlight controller. The modulator consecutively and repeatedly applies low levels and high levels of a current control signal. The backlight controller reduces a driving current, which is divided step by step, from a reference current according to the current control signal, and outputs the driving current to a backlight unit. The modulator applies the high levels for at least a second reference time interval after the low levels are applied for at least a first reference time interval, such that the driving current is reduced from the reference current corresponding to a number of the high levels.

The modulator may apply the low levels for less than a third reference time interval.

The modulator may apply the low levels for at least the third reference time interval to turn off the backlight unit.

The modulator may apply the low levels for less than the first reference time interval and then apply the high levels to reduce the driving current step by step.

In an exemplary embodiment of the present invention, a display apparatus includes a display panel, a backlight unit, a backlight controller, and a modulator. The display panel displays an image. The backlight unit supplies light to the display panel. The backlight controller supplies a driving current, which is gradually divided, to the backlight unit by reducing the driving current from a reference current according to a current control signal. The modulator consecutively and repeatedly applies low levels and high levels of the current control signal to the backlight controller. The modulator applies the high levels for at least a second reference time interval after the low levels are applied for at least a first reference time interval, such that the driving current is reduced from the reference current corresponding to a number of the applied high levels.

The backlight unit includes a light emitting diode.

The modulator may apply the low levels for less than a third reference time interval.

The modulator may apply the low levels for at least the third reference time interval to turn off the backlight unit.

The modulator may apply the low levels for less than the first reference time interval and then the high levels to reduce the driving current in a step-by-step fashion.

The display panel further includes a sensor to measure brightness of a surrounding environment.

The modulator may modulate an image of the display panel and information about the brightness of the surrounding environment into the current control signal.

According to above, the driving current is selectively changed according to the brightness of a display image and the brightness of a surrounding environment and applied to a backlight unit, thereby reducing power consumption of the backlight unit.

BRIEF DESCRIPTION OF THE DRAWINGS

Exemplary embodiments of the present invention will be understood in more detail from the following descriptions taken in conjunction with the accompanying drawings wherein.

DETAILED DESCRIPTION OF EXEMPLARY EMBODIMENTS

Figure 1:
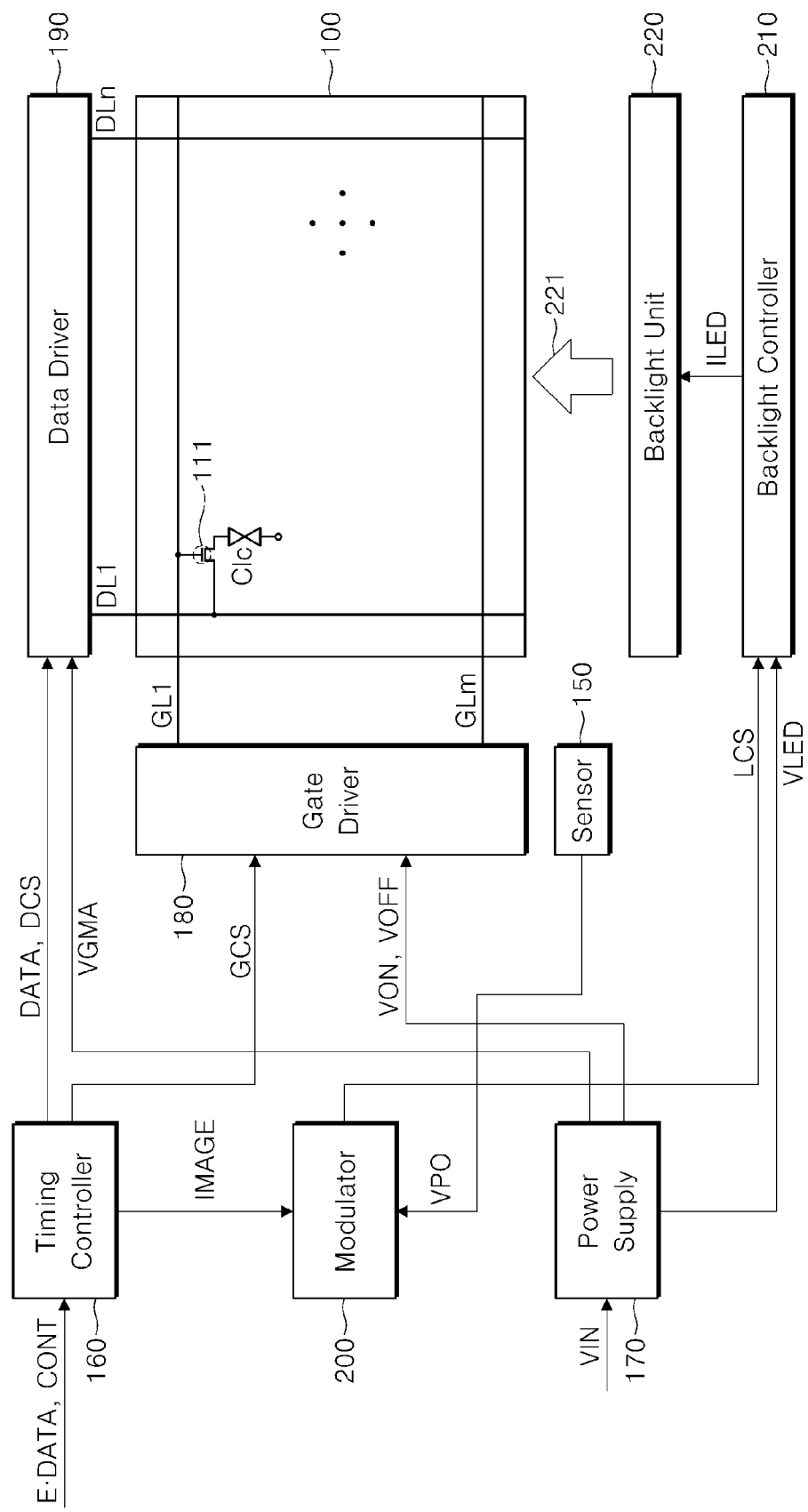
FIG. 1 is a block diagram showing an exemplary embodiment of a display apparatus according to the present invention.

Hereinafter, an apparatus and a method of driving a backlight unit and a display apparatus employing the same according to an exemplary embodiment of the present invention will be described in detail with reference to the accompanying drawings, so that those of ordinary skill in the art can completely understand the present invention. The size of layers and regions shown in the drawings can be simplified or magnified for the purpose of clear explanation. In addition, the same reference numerals are used to designate the same elements throughout the drawings.

FIG. 1 is a block diagram showing an exemplary embodiment of a display apparatus according to the present invention.

Referring to FIG. 1, the display apparatus includes a display panel 100, a timing controller 160, a power supply 170, a gate driver 180, a data driver 190, a modulator 200, a backlight unit 220, and a backlight controller 210.

The display panel 100 includes a plurality of gate lines GL1 to GLm and a plurality of data lines DL1 to DLn that cross the gate lines GL1 to GLm, a thin film transistor 111, and a liquid crystal capacitor Clc connected to the thin film transistor 111. The display panel 100 further includes a sensor 150 to detect the brightness of the surrounding environment. The sensor 150 provides external optical information to the modulator 200 as a photo-voltage VPO in order to measure the brightness of the surrounding environment.

The timing controller 160 converts external data signals EDATA input from an external device into data signals DATA, which can be processed by the data driver 190, and supplies the data signals DATA to the data driver 190. The timing controller 160 generates a data control signal DCS to control the data driver 190 and a gate control signal GCS to control the gate driver 180 and applies the data and gate control signals DCS and GCS to the data driver 190 and the gate driver 180, respectively. The data control signal DCS generated from the timing controller 160 includes a source start pulse and a source clock. The gate control signal GCS includes a gate start pulse and a gate shift clock.

The power supply 170 converts input power VIN supplied from an external device into power required for the gate driver 180 and the data driver 190 and then applies the power to the gate driver 180 and the data driver 190. More specifically, the power supply 170 converts the input power VIN to apply a gate-on-voltage VON and a gate-off-voltage VOFF to the gate driver 180 and to apply a gamma voltage VGMA to the data driver 190.

The gate driver 180 receives the gate control signal GCS from the timing controller 160, and the gate-on-voltage VON and the gate-off-voltage VOFF from the power supply 170. The gate driver 180 sequentially applies the gate-on-voltage VON to the gate lines GL1 to GLm. The gate driver 180 applies a gate-off-voltage VOFF to the gate line GL to which the gate-on-voltage VON is applied. In other words, the gate driver 180 simultaneously turns on a plurality of thin film transistors 111 sequentially connected to the gate lines GL1 to GLm.

The data driver 190 receives the data control signal DCS and the data signals DATA from the timing controller 160, and receives the gamma voltage VGMA used to express the gray scale of the data signals DATA from the power supply 170 and applies the data signals DATA and the gamma voltage VGMA to the data lines DL1 to DLn.

The modulator 200 converts the photo-voltage VPO input from the sensor 150 into first digital data. The modulator 200 analyzes image information IMAGE input from the timing controller 160 to convert the brightness of pixel data into second digital data. Then, the modulator 200 mixes the first and second digital data into third digital data. In this case, the modulator 200 mixes the first and second digital data through an algorithm capable of controlling the brightness of the backlight unit 220. The modulator 200 modulates the third digital data into a current control signal LCS having low and high levels and applies the current control signal LCS to the backlight controller 210 to control the light output of the backlight unit 220. The modulator 200 can modulate the current control signal LCS through a pulse code modulation (PCM) scheme or through pulse width modulation (PWM).

The modulator 200 may consecutively and repeatedly apply low levels and high levels of the current control signal LCS to the backlight controller 210. In this exemplary embodiment, the modulator 200 may apply the low levels for at least a first reference time interval and then the high levels for at least a second reference time interval, such that a backlight driving current ILED is reduced corresponding to the number of the applied high levels. In addition, the modulator 200 may apply the high levels after applying the low levels for less than the first reference time such that the backlight driving current ILED is gradually reduced.

The backlight unit 220 includes a light emitting diode, hereinafter, referred to as "an LED", to generate light and supplies the light to the display panel 100. The LED is a current driven element, and receives the backlight driving current ILED from the backlight controller 210 in order to drive the backlight unit 220.

The backlight controller 210 converts the backlight voltage VLED received from the power supply 170 into the backlight driving current ILED. The backlight controller 210 applies the backlight driving current ILED to the backlight unit 220. The backlight controller 210 applies the backlight driving current ILED, which is divided step by step, to the backlight 220 according to the current control signal LCS applied from the modulator 200.

Figure 2:
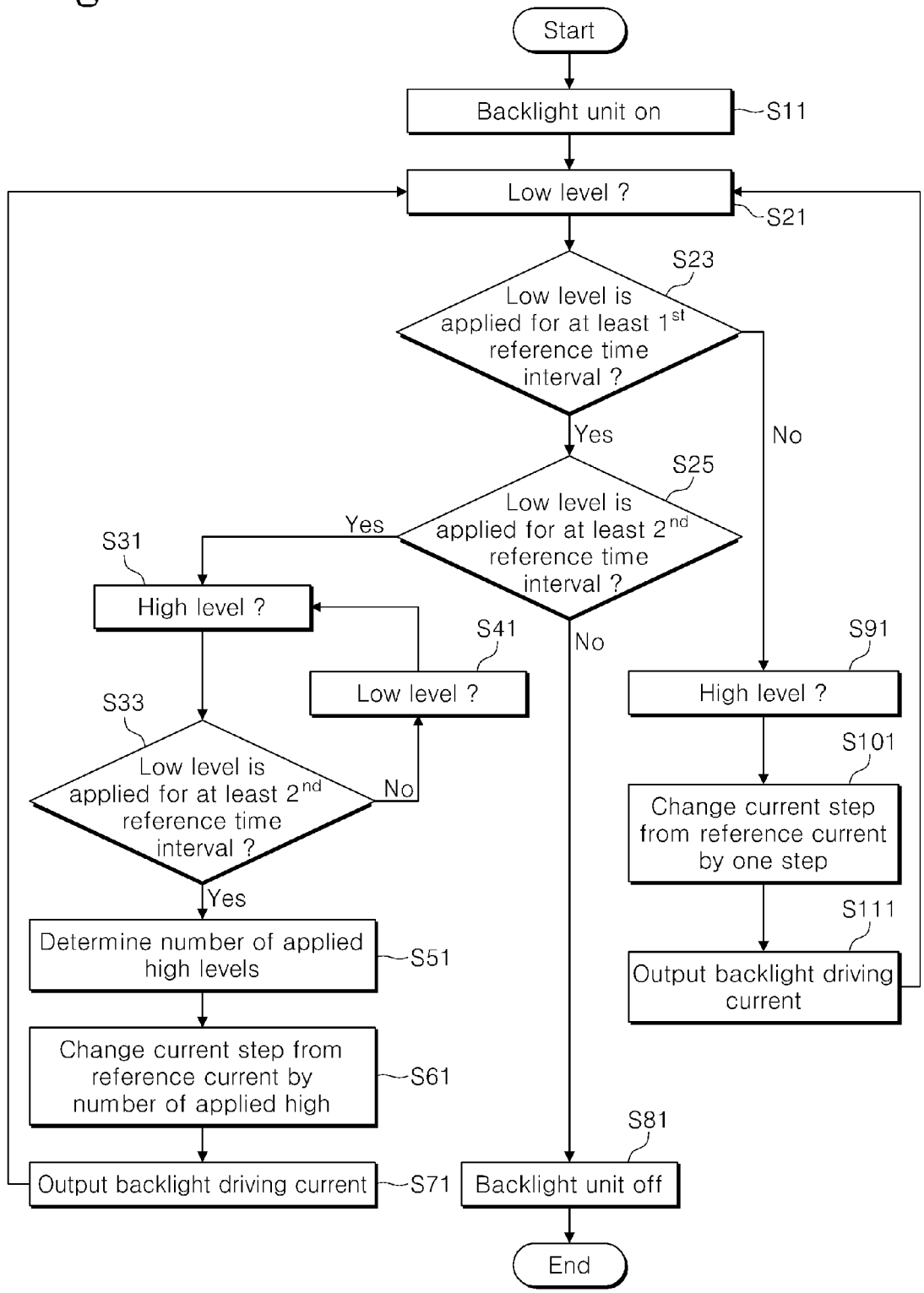
FIG. 2 is a flowchart showing an exemplary embodiment of a method of driving a backlight unit according to an exemplary embodiment of the present invention.
Figure 3:
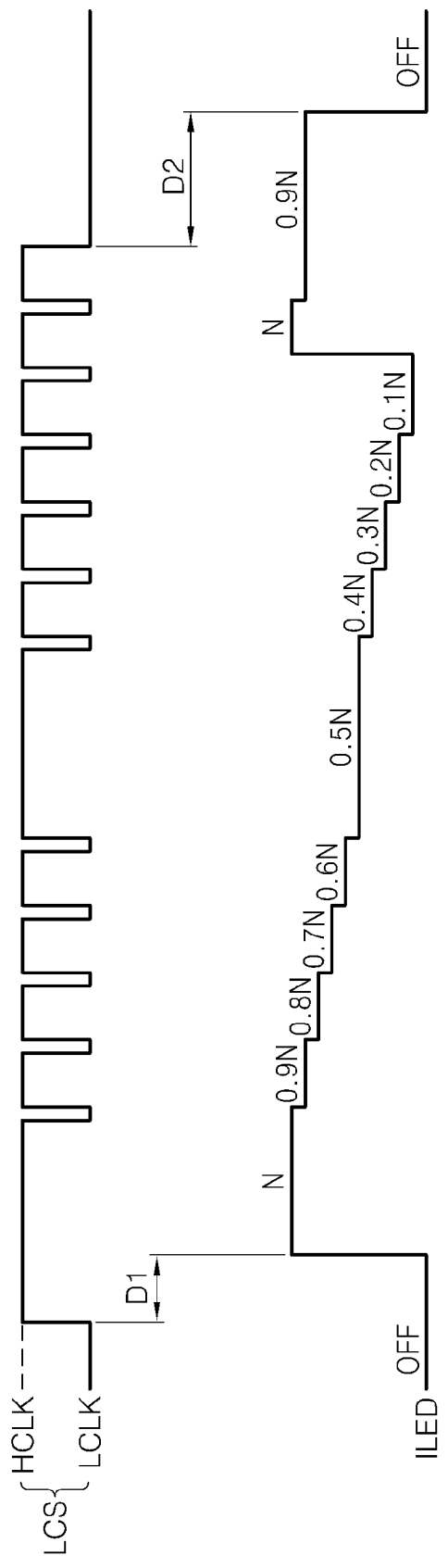
FIG. 3 is a timing chart showing the variation of a backlight driving current according to the present invention.
Figure 4:
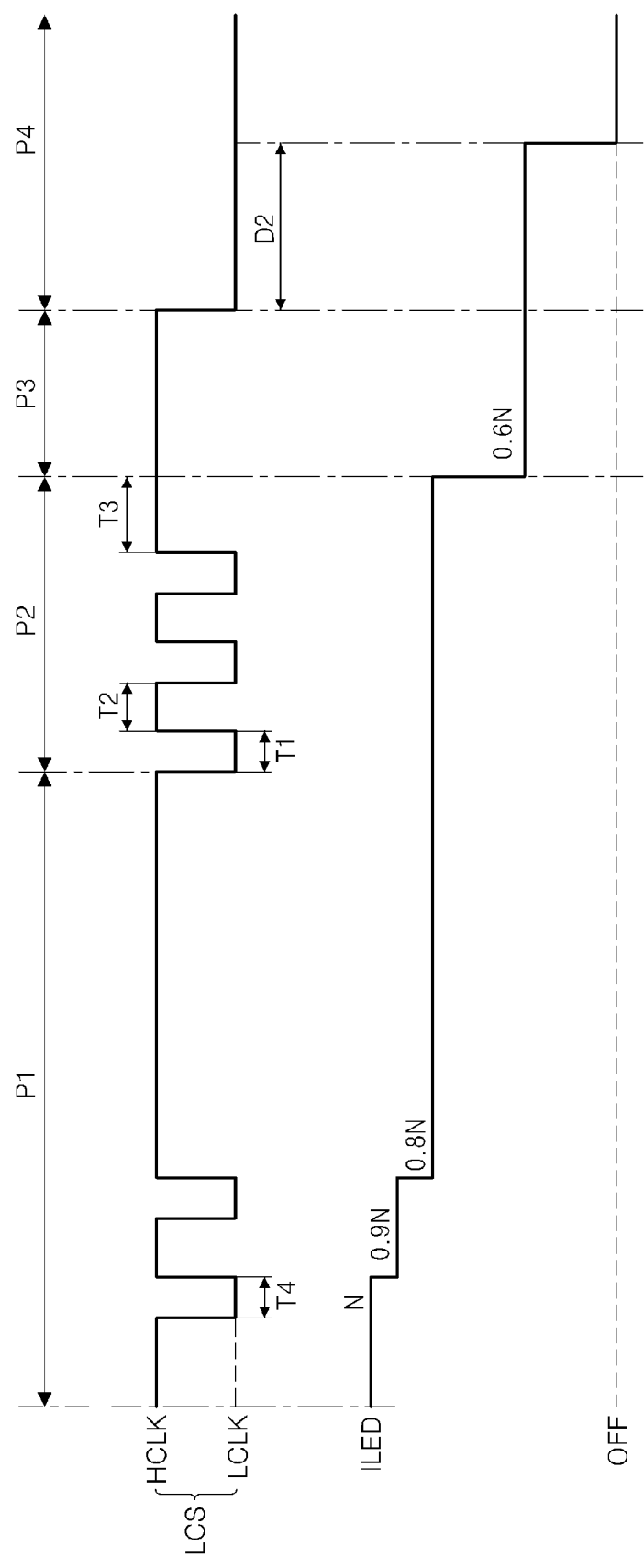
FIG. 4 is a timing chart showing the variation of a backlight driving current according to a current control signal in order to explain the method of driving the backlight unit shown in FIG. 2.

Hereinafter, a method of driving the backlight unit 220 according to an exemplary embodiment of the present invention will be described with reference to FIGS. 2 to 4. FIG. 2 is a flowchart showing an exemplary embodiment of the method of driving the backlight unit 220 according to the present invention, and FIG. 3 is a timing chart showing the variation of the backlight driving current ILED according to the present invention. FIG. 4 is a timing chart showing the variation of the backlight driving current ILED according to the current control signal LCS in order to explain the method shown in FIG. 2 for driving the backlight unit 220 shown in FIG. 1.

Referring to FIGS. 2 to 4, in the method of driving the backlight unit 220, the backlight driving current ILED, which is divided in a step-by-step fashion, is selectively changed and provided according to the current control signal LCS.

The backlight driving current ILED is applied to the backlight unit 220 to turn on the backlight unit 220 (S11). As shown in FIG. 3, the modulator 200 applies an initial high level HCLK of the current control signal LCS to the backlight controller 210 for at least a reference time interval D1 of the lighting period. The backlight controller 210 outputs the backlight driving current ILED having the maximum intensity N when the initial high level HCLK is applied for more than the reference time interval D1 of the lighting period. For example, as shown in FIG. 3, the intensity of the backlight driving current ILED may be divided step by step from the maximum intensity N to the minimum intensity 0.1N.

Then, the modulator 200 applies a low level LCLK of the current control signal LCS to the backlight controller 210 (S21). After outputting the backlight driving current ILED having the maximum intensity N, the modulator 200 applies the low level LCLK to the backlight controller 210 for a predetermined time interval. At this time, the backlight controller 210 determines whether the low level LCLK is applied for at least the first reference time interval or not (S23). If the low level LCLK is applied for at least the first reference time interval, the backlight controller 210 determines whether the low level LCLK is applied for less than the second reference time interval or not (S25).

As shown in FIG. 4, if the low level LCLK is applied for at least a first reference time interval T4 and for less than a second reference time interval T1, the backlight controller 210 shown in FIG. 1 recognizes a present mode as a preliminary mode P2. In other words, the second reference time interval T1 is longer than the first reference time interval T4. In addition, the backlight controller 210 recognizes the present mode as a sequential mode P1 if the low level LCLK is applied for less than the first reference time interval T4. The backlight controller 210 recognizes the present mode as an off-mode P4 if the low level LCLK is applied for at least the second reference time interval T1.

Then, the modulator 200 applies the high level HCLK to the backlight controller 210 in the preliminary mode P2 and the sequential mode P1.

In the preliminary mode P2, the backlight controller 210 determines whether the high level HCLK is applied for a third reference time interval T2 or not (S33). As shown in FIG. 4, if the high level HCLK is applied for less than the third reference time interval T2 in the preliminary mode P2, the backlight driving current ILED having uniform intensity is output. After the high level HCLK is applied for less than the third reference time interval T2, the modulator 200 consecutively applies the low level LCLK and the high level HCLK (S41 and S31).

Then, if the high level HCLK is applied for at least the third reference time interval T3 in the preliminary mode P2, the backlight controller 210 recognizes the present mode as a jump mode P3, and checks the number of the high levels HCLK applied for less than the third reference time interval T3 (S51). As shown in FIG. 4, the backlight controller 210 recognizes two high levels HCLK applied for less than the third reference time interval T3.

Next, the backlight controller 210 shown in FIG. 1 changes the intensity of the backlight driving current ILED corresponding to the number of the applied high levels HCLK based on a reference current intensity (S61). The reference current intensity refers to the intensity of the backlight driving current ILED output in the preliminary mode P2.

Then, the backlight controller 210 outputs the backlight driving current ILED that is changed corresponding to the number of the applied high levels HCLK (S71). As shown in FIG. 4, the backlight controller 210 outputs the backlight driving current ILED having the intensity of 0.6N changed from the reference current intensity of 0.8N corresponding to two steps.

In this exemplary embodiment, in the sequential mode P1 in which the low level LCLK is applied for less than the first reference time interval T4, the backlight controller 210 changes the intensity of the backlight driving current ILED by one step from a reference current intensity when the high level HCLK is applied (S101). For example, as shown in FIG. 3, the reference current intensity is the maximum current intensity of N.

Next, the backlight controller 210 outputs the backlight driving current ILED having the current intensity 0.9N changed from the reference current intensity N corresponding to one step (S11).

Finally, in the off-mode P4, the backlight controller 210 outputs the backlight driving current ILED having an off current intensity at a time point at which the low level LCLK is applied for at least the second reference time interval D2, so that the backlight unit 220 is turned off (S81).

Meanwhile, the backlight controller 210 may receive clocks having different periods in the sequential mode P1 and the preliminary mode P2. The clock is the current control signal LCS. For example, the clock applied in the sequential mode P1 has a period covering the low level LCKL applied for less than the first reference time interval T4. The clock applied in the preliminary mode P2 has a period covering the low level LCLK applied for at least the first reference time interval T4 and for less than the second reference time interval T1 and the high level HCLK applied for less than the third reference time interval T2.

According to the above-described exemplary embodiment, a driving current is selectively changed according to the brightness of the display image and the brightness of the surrounding environment and is applied to the backlight unit, thereby reducing power consumption of the backlight unit.

Further, the driving apparatus for the backlight unit may change the brightness of the backlight unit adaptively for a surrounding environment as compared with a conventional apparatus employing a conventional PCM scheme. In addition, the driving apparatus for the backlight unit may apply a constant driving current and prevent noise of the control signal, so that the apparatus may be stably operated, as compared with conventional apparatus employing the conventional PWM scheme.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A method of driving a backlight unit, the method comprising:
    selectively changing and outputting a driving current, which is divided in a step-by-step fashion, according to a current control signal,
    wherein the current control signal includes low levels and high levels that are consecutively and repeatedly applied, and
    wherein the driving current is reduced in one step from a reference current by the number of high levels during a time period that starts when a low level of the low levels is applied for at least a first reference time interval and ends when a high level of the high levels is applied for at least a second reference time interval.

2. The method of claim 1, wherein a low level of the low levels is applied for less than a third reference time interval.

3. The method of claim 2, wherein an output of the driving current stops when a low level of the low levels is applied for at least the third reference time interval.

4. The method of claim 1, wherein the driving current is reduced by one step whenever a high level of the high levels is applied after a low level of the low levels is applied for less than the first reference time interval.

5. A method of driving a backlight unit, the method comprising:
    outputting a first driving current reduced stepwise by a predetermined level whenever a first clock signal is applied; and
    outputting a second driving current reduced in one step by n times the predetermined level, when a second clock signal having a period different from a period of the first clock signal is applied, wherein n is a natural number greater than or equal to 2.

6. The method of claim 5, wherein the second clock signal is applied when a low level of the first clock signal is applied for at least a first reference time interval and for less than a second reference time interval.

7. The method of claim 6, wherein the second driving current is output when a high level of the second clock signal is applied for at least a third reference time interval.

8. The method of claim 7, wherein n is the number of high levels of the second clock signal before the high level of the second clock signal is applied for at least the third reference time interval.

9. The method of claim 8, wherein the second driving current is reduced in a step-by-step fashion and then reduced to a predetermined level.

10. An apparatus for driving a backlight unit, the apparatus comprising:
    a backlight controller; and
    a modulator that consecutively and repeatedly applies low levels and high levels of a current control signal to the backlight controller,
    wherein the backlight controller reduces a driving current, which is divided in a step-by-step fashion, from a reference current according to the current control signal, and outputs the driving current to a backlight unit, and
    wherein the modulator applies a high level of the high levels for at least a second reference time interval after a low level of the low levels is applied for at least a first reference time interval, such that the driving current is reduced in one step from the reference current by the number of high levels between the first reference time interval and the second reference time interval.

11. The apparatus of claim 10, wherein the modulator applies a low level of the low levels for less than a third reference time interval.

12. The apparatus of claim 11, wherein the modulator applies a low level of the low levels for at least the third reference time interval to turn off the backlight unit.

13. The apparatus of claim 12, wherein the modulator applies a low level of the low levels for less than the first reference time interval and then applies the high levels to reduce the driving current in a step-by-step fashion.

14. A display apparatus comprising:
    a display panel that displays an image;
    a backlight unit that supplies light to the display panel;
    a backlight controller that supplies a driving current, which is gradually divided, to the backlight unit by reducing the driving current from a reference current according to a current control signal; and
    a modulator that consecutively and repeatedly applies low levels and high levels of the current control signal to the backlight controller, and applies a high level of the high levels for at least a second reference time interval after a low level of the low levels is applied for at least a first reference time interval, such that the driving current is reduced in one step from the reference current by the number of high levels between the first reference time interval and the second reference time interval.

15. The display apparatus of claim 14, wherein the backlight unit comprises a light emitting diode.

16. The display apparatus of claim 15, wherein the modulator applies a low level of the low levels for less than a third reference time interval.

17. The display apparatus of claim 16, wherein the modulator applies a low level of the low levels for at least the third reference time interval to turn off the backlight unit.

18. The display apparatus of claim 15, wherein the modulator applies a low level of the low levels for less than the first reference time interval and then applies the high levels to reduce the driving current in a step-by-step fashion.

19. The display apparatus of claim 14, wherein the display panel further comprises a sensor to measure brightness of a surrounding environment.

20. The display apparatus of claim 19, wherein the modulator modulates an image of the display panel and information about the brightness of the surrounding environment into the current control signal.

* * * * *